Oct. 1, 1957  P. S. CHRISTIE ET AL  2,808,355
GLASS ENCLOSURE
Filed June 11, 1956  2 Sheets-Sheet 1

INVENTORS
LESTER G. HALL
PETER S. CHRISTIE
FRANCIS A. RUTKOSKY

BY *William R. Lane*

ATTORNEY

Oct. 1, 1957 P. S. CHRISTIE ET AL 2,808,355
GLASS ENCLOSURE
Filed June 11, 1956 2 Sheets-Sheet 2

INVENTORS
LESTER G. HALL
PETER S. CHRISTIE
FRANCIS A. RUTKOSKY

BY William P. Lane
ATTORNEY

United States Patent Office 2,808,355
Patented Oct. 1, 1957

2,808,355
GLASS ENCLOSURE

Peter S. Christie, Denver, Colo., Lester G. Hall, Los Angeles, and Francis A. Rutkosky, Torrance, Calif., assignors to North American Aviation, Inc.

Application June 11, 1956, Serial No. 590,455
11 Claims. (Cl. 154—2.71)

This invention pertains to a glass enclosure and more particularly to a windshield enclosure for a vehicle such as an aircraft.

The mounting of glass panels, such as for windshields, has always involved certain problems due to the nature of the glass material. It cannot withstand bearing loads such as imposed by a bolted connection, so that it has been customary to provide some manner of projection from the edge of the glass which may be bolted or otherwise secured to a mounting frame. For modern aircraft, a mounting arrangement is generally some sort of device cemented to the edge of the glass and extending to the structural portions of the aircraft. There is difficulty in providing a cemented connection of sufficient strength to withstand the forces imposed by the aircraft when in flight. The cemented connections are relatively strong in shear but subject to failure from peeling. Also moisture and weathering are known to have deleterious effects on cemented joints. There are additional problems of providing a mounting of minimum opaque area, resistant to high temperature, vibration and other adverse conditions.

Accordingly it is an object of this invention to provide a glass enclosure with a high strength edge mounting.

An additional object of this invention is to provide an edge mounting which will accommodate the wide range of thickness and fabrication tolerances inherent in glass.

Another object of this invention is to provide a glass enclosure having an edge mounting resistant to loads in all directions.

A further object of this invention is to provide a glass enclosure, the edge mounting of which is not adversely affected by moisture or weathering.

Yet another object of this invention is to provide a glass enclosure having an edge mounting which will stand high temperatures, vibrations and like effects while also providing a shock mounting for the glass panel.

A still further object of this invention is to provide a glass enclosure having a mounting of simple, economical construction providing a minimum of opaque area around the margin of the glass.

These and other objects will become apparent from the following detailed description taken in connection with the accompanying drawings in which.

The device of this invention includes the provision of a metalized marginal portion on a glass panel, to which is cemented a fabric loop. Also included are fabric attaching strips extending from the loop and stitched thereto so that side loads will be taken in shear by the loop along the edge surface of the glass. The fabric projections include metal strips bonded thereto for receiving bolts and attaching the glass to adjacent structure. A fairing, sealing and shock absorbing material is also provided around the mounting structure between the same and the glass, this preferably being applied by an injection process.

Figure 1:
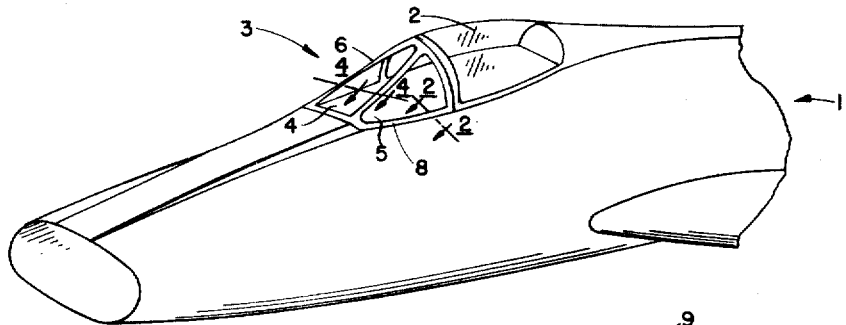
Fig. 1 is a fragmentary perspective view of an aircraft employing the provisions of this invention.

Fig. 1 illustrates an aircraft 1 of the type which advantageously utilizes the provisions of this invention. The cockpit area of the aircraft is enclosed by a canopy 2 which may be of plastic, and a windshield 3 of glass. In the design illustrated, the windshield is composed of a front panel 4 and side panels 5 and 6. The edges of the side and front panels must be interconnected and the panels also must be attached to the aircraft structure.

Figures 2, 6:
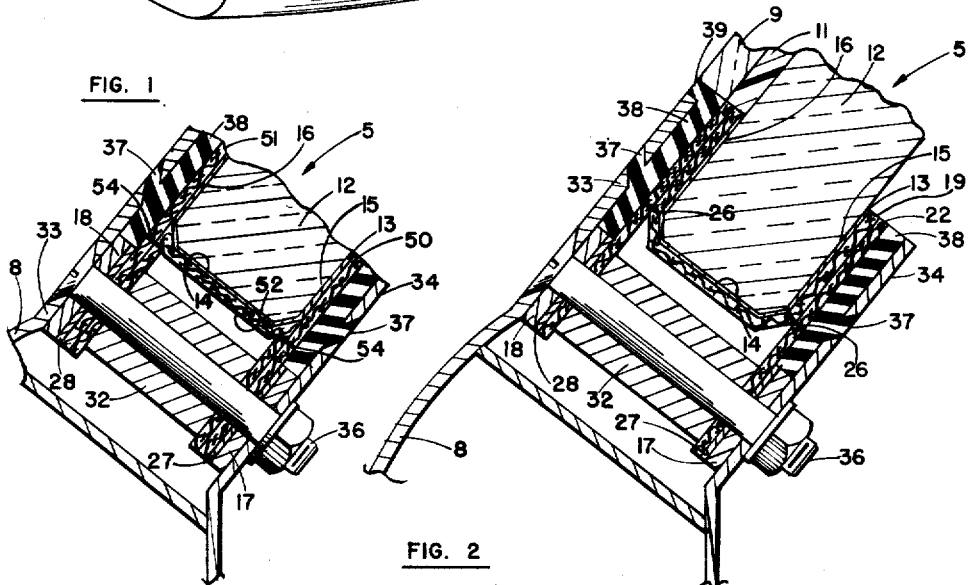
Fig. 2 is an enlarged sectional view taken along line 2—2 of Fig. 1.
Fig. 6 is a sectional view similar to Fig. 2 of a modified form of the invention.
Figure 3:
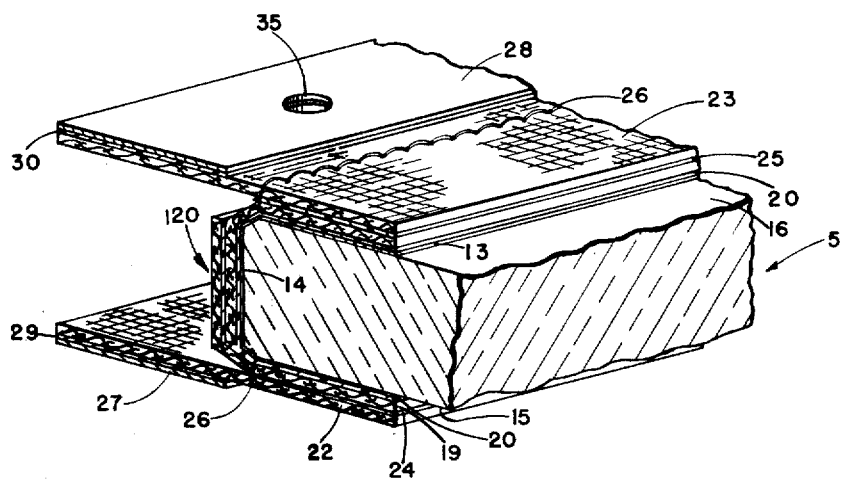
Fig. 3 is a fragmentary perspective view of the attachments to the edge of the glass panel.

An enlarged sectional showing of the connection of side panel 5 to the aircraft structure 8 may be seen in Fig. 2, while a perspective of the attachments to the glass panel appears in Fig. 3. Typically this glass panel may be constructed as a laminated assembly having an outer ply 9 of partially tempered glass, an inner ply 11 of an interlayer material such as vinyl, and a larger ply 12 of partially tempered glass. This provides a transparent member of high strength shatter proof construction which will have adequate optical properties. According to this invention the edge portion of the glass laminate is constructed so that larger ply 12 projects beyond the other plies. This projecting portion of the glass panel is suitably treated to increase the strength and resistance to weathering of the cemented attachment subsequently made thereto. For this reason it may be given a metalized coating 13 over the entire area thereof including end wall 14 as well as side portions 15 and 16. The metalized surface may be obtained by conventional metal spray techniques after heating the glass to the neighborhood of 650° F. to 700° F. In providing an adequate basis for the cemented joint the coating need be only around .001 to .002 in. thick. This is achieved when the coating provides an opaque surface. The areas not to be coated may be protected by masking, or any metal spray inadvertently applied to those surfaces may be removed by a dilute solution of hydrocloric acid.

Cemented to the metalized surface is a flexible loop 19. A vinyl-phenolic cement 20 (for clarity the cement is shown only in Fig. 3) may be used in providing the bond between the loop and the metalized surface. The loop may be a one-piece member as illustrated in Fig. 2. Preferably, however, the loop is of split construction as shown in Fig. 3, having an overlapping portion 120 along end wall 14 of the glass, for reasons which will be made more clear hereinafter. In the preferred embodiment of the invention loop 19 is constructed of a woven fabric. This may be a synthetic material such as nylon or Dacron because of its high strength characteristics. (Dacron is a product of E. I. du Pont de Nemours and Co., Inc., Wilmington, Delaware.) Overlying and bonded to loop 19 are strips 22 and 23 projecting from either side of the marginal portions of the glass. These may be cemented to the loop by additional layers 24 and 25 of a suitable adhesive such as vinyl-phenolic cement. These projecting strips are also preferably of a woven fabric such as Dacron. An additional connection is made between strips 22 and 23 and loop 19 in the form of stitched seams 26 running the length of the strips substantially at the location of edge surface 14 of the glass panel. The split construction of loop 19 permits precise alignment of these stitched seams with the edge of the glass regardless of irregularities which may be encountered in the edge contour of the glass panel.

The outer projecting portions of strips 22 and 23 are provided with bearing strips 27 and 28 suitably bonded thereto by cement layers 29 and 30. These strips absorb the tension loads applied on the glass panel and may be made of any suitable material such as aluminum or steel.

The projecting portions of strips 22 and 23 overlap a central spacer bar 32, also extending the length of the edge mounting. This member maintains the projecting portions of members 22 and 23 spaced apart substantially the distance between side surfaces 15 and 16 of the glass ply. The entire edge portion is overlapped by structural portions 33 and 34 of the aircraft which extend over the side of the projecting ply 12 of the panel and are spaced from the fabric members attached thereto. Additional spacers 17 and 18 may be necessary to assure that structural members 33 and 34 are positioned properly with respect to the glass. The outer surface of member 33 is preferably substantially in alignment with the outer surface of glass panel 5. The bearing strips and fabric projections are apertured as at 35. Similarly, openings are provided through the structural members and member 32, these apertures being for the purpose of receiving a plurality of bolts 36 which secure the glass panel to the aircraft structure.

It is necessary for several reasons to fill the space between the overlapping portions of the aircraft structure and the sides of the joint at the glass. Contact between these rigid structural members and the glass must be avoided regardless of any movement of the glass under loads to avoid breakage of the glass. On the other hand, it is necessary to transmit side loads on the glass to the structural members. Also it is preferred to seal the joint area to retard weathering and moisture effects which might damage the joint construction. Additionally it is necessary to provide a fairing between the glass panel and the aircraft structure for aerodynamic purposes. Another requirement is the provision of a shock absorbing medium so that impact loads on the glass may be dissipated. It has been found that a conventional gasket is unsatisfactory as the material for this area. One major difficulty with the use of a gasket is that the glass obtained from production runs has considerable variations in its surface contour so that the space is of unequal and irregular shape throughout its length. A gasket may fit with difficulty in one location while a gap will be left in another. Where the gasket is tight against the glass, localized concentrated loads will be obtained which may crack the glass. Where the gasket is loose the joint will not be sealed. Also it is difficult to provide a fairing or a satisfactory shock absorbing medium by means of a gasket. Additionally, known gasket materials of a type which might conceivably be used are not sufficiently resistant to the high temperatures encountered by modern high performance aircraft.

For these reasons a series of injection holes 37 is provided along the length of the joint and a viscous material 38 is injected into this area. Preferably the injection openings are inclined toward the bolt as indicated to assure that the entire area will be filled with the injected material. Complete filling of this area is indicated by appearance of the injected material at the surface around gap 39 between the glass and structural member 33. Excess material at this gap is removed to provide a smoothly faired surface. The injection openings are suitably spaced along the joint and are generally around three inches apart.

The material injected into the space around the joint may have the following composition:

| Base material: | Parts per hundred |
| --- | --- |
| Methyl methacrylate monomer | 45.0 |
| Cellulose acetate butyrate | 15.0 |
| Silica (325 flint mesh) | 15.0 |
| Catalyst A: | |
| N-N Dimethylaniline | 0.3 |
| Tricresyl phosphate | 9.0 |
| Catalyst B: | |
| Benzoyl peroxide | 0.25 |
| Coloring | 0.5 |
| Tricresyl phosphate | 14.95 |

The catalysts should be mixed with the base material just prior to using. The tricresyl phosphate in the catalyst serves as a plasticizer and increases the impact resistance of the material. It is preferred to use a cellulose acetate butyrate ester containing approximately 38 percent by weight butyrate and the remainder cellulose acetate.

This material cures to a consistency where it will adequately seal the joint and will provide a smooth fairing medium between the structural portions and the glass. It will prevent contact of the structural members with the glass, and also possesses shock absorbing characteristics so that it can dissipate impact loads imposed on the windshield.

The contruction outlined above, wherein a loop is provided around the edge portion of the glass, and strips project therefrom for bearing engagement with the bolts, has certain important advantages. The bond between loop 19 and the marginal portions of the side of the glass, and between strips 22 and 23 and the loop, will absorb in shear the tension forces on the glass tending to separate the joint in the general direction of the plane of the glass. These loads are taken along side surfaces 15 and 16 of the glass.

The stitched connection between loop 19 and fabric strips 22 and 23 has the function of preventing the imposition of peel forces on the cemented attachment for the fabric. Such forces may occur, for example, upon side movement of the glass relative to the fixed structure which will tend to peel one of the strips from the loop. Seams 26 prevents this from happening. The mechanical connection of the seams transmits the peel forces to the portion of the loop bonded to edge surface 14 of the glass where these forces are taken in shear along this surface. Thus the adhesive connection between the fabric strips and the loop is not subjected to peeling forces, for which it has relatively low resistance, but all loads are absorbed in shear.

The metalized surface on the glass makes an improved basis for a cement joint to the loop member 19. A cement bond with a metalized surface has been found to be far less susceptible to deterioration from moisture than an ordinary joint with the surface of the glass itself. The particles of metal provided by the metalizing technique assure that a strong bond is obtained.

The problem of irregularities in the glass panel is taken care of by means of split construction of the loop and by the injection procedure for the sealing, shock absorbing and fairing material. The injection procedure is much simpler than installing a gasket and mass production of the joint of this type is greatly facilitated by this procedure.

The connection of the glass to the rigid structure by means of the flexible fabric members permits vibrational forces to be dissipated without damage to the glass. Injected material 37 should not be of a nature such that it cures to a completely rigid unyielding consistency which would prevent any movement of the joint. This type of construction also allows the relative movement of the joint components caused by elevated temperature conditions.

Figure 4:
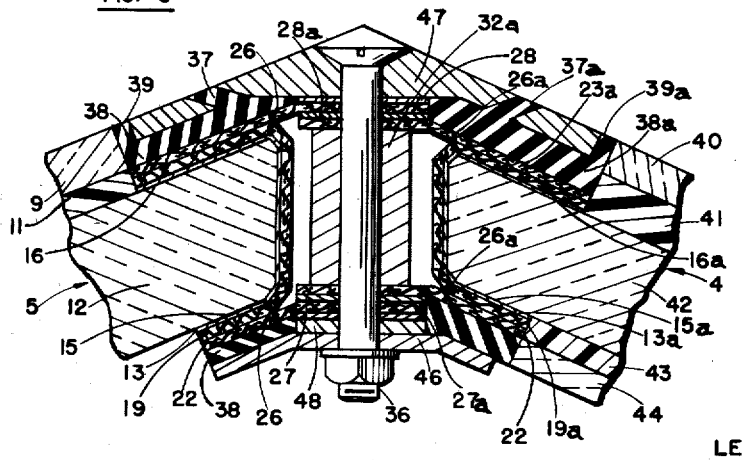
Fig. 4 is an enlarged sectional view taken along line 4—4 of Fig. 1.
Figure 5:
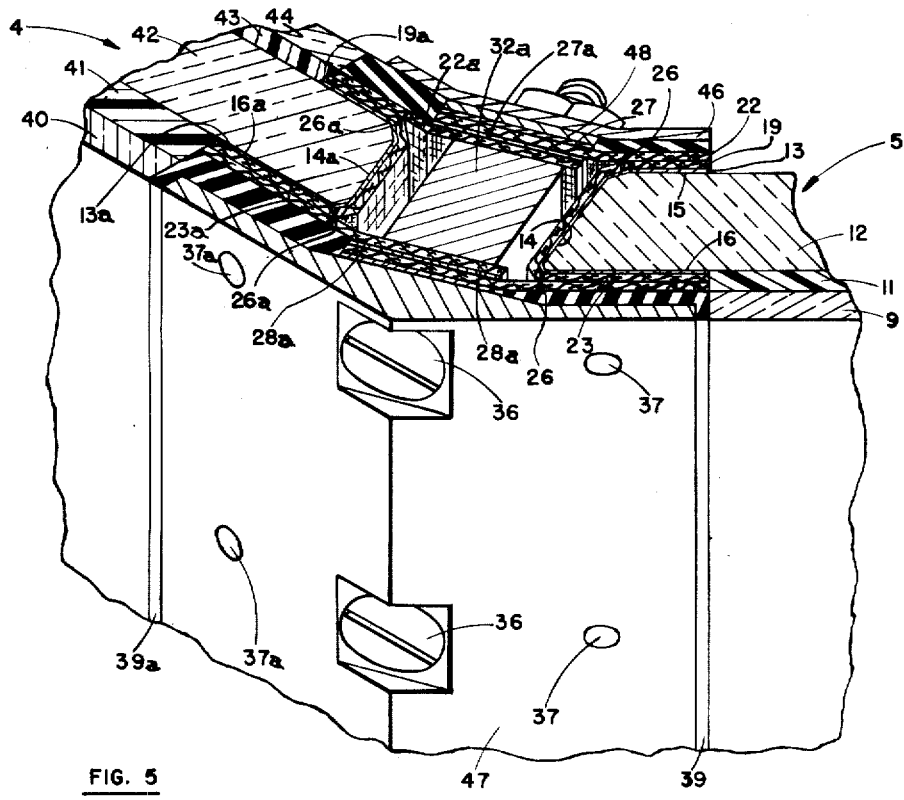
Fig. 5 is a perspective view of the corner mounting arrangement for adjoining panels.

The connection between the side panel 5 and center panel 6 of the windshield may be seen in Figs. 4 and 5. By the teachings of this invention an exceptionally narrow corner post results so that the opaque portion of the windshield is greatly reduced and the pilot's vision is correspondingly increased. This is of particular importance and represents one of the major advantages of the design of this invention over the prior art structures. This design also permits attachment of glass panels of different thicknesses. The attachments to the windshield are basically the same as described above so that the elements attached to center panel 4 corresponding to those of the previously described joint are given the same numbers with the suffix "a" added.

In the design illustrated, center panel 4 is also of a laminated construction but thicker than panel 5, having an outer ply 40 of glass, an intermediate layer 41 of vinyl, a larger central layer 42 of glass, another layer of vinyl 43 on the inner side of this glass layer, and finally a glass lamina 44 on the inside surface of the windshield panel. The central layer 42 of the center panel projects beyond the outer layers thereof and serves as a location for the attachment of loop 19a, which again is bonded to a metalized surface.

For the corner construction projecting strips 22—23 and 22a—23a with their bearing strips overlap each other on either side of the central spacing bar 32a. These overlapping portions are provided with coaxial apertures which receive bolts 36 which attach the same to inner corner member 46 and outer corner member 47. Spacer 48 is included to maintain member 46 a proper distance from the surfaces of the glass. By this arrangement only one row of bolts is necessary for attaching two panel members. The centrally located corner members project in either direction over the edge portions of the glass and the fabric members. This overlapping arrangement results in a compact structure wherein a minimum of opaque area is presented. Note that forces tending to peel the cemented attachment of the fabric strips are inherent in this design due to the angular relationship between panels 4 and 5. The stitched connections at the edge surfaces of the glass panels, therefore, are of particular importance for this embodiment of the invention.

A slightly modified form of this invention is shown in Fig. 6. Here the only difference is the form of the loop around the edge of the glass, and of the projecting fabric strips. By this design, fabric strips 50 and 51 are bonded directly to the marginal side portions 15 and 16 of the glass. An additional fabric member 52 is bonded to edge surface 14 and to the projecting portions of strips 50 and 51. Stitched connections 54 at substantially the location of edge surface 14 further secures member 52 to strips 50 and 51. Therefore, the cemented connections again will not be subjected to peel forces, but will take loads in shear along surfaces 14, 15 and 16 of the glass. Also, member 52 may be in two pieces, overlapping along surface 14 in the same manner as member 19 of Fig. 3, to compensate for irregularities in the glass.

Therefore it is apparent that we have provided an improved glass mounting arrangement of simplified design, yet which is of high strength construction which will not permit damage to the glass.

The foregoing detailed description is to be understood as given by way of example, the spirit and scope of this invention being limited only by the appended claims.

We claim:

1. An edge mounting for a panel having marginal side surfaces terminating in an edge surface, comprising means of flexible sheet material bonded to and extending complementarily along said side and edge surfaces, strip means of flexible sheet material integrally attached to said firstly mentioned means, said strip means including load carrying means secured thereto remote from and in spaced relationship with said edge surface for providing an attaching means for said panel.

2. A device as recited in claim 1 including in addition means on said side surfaces and said edge surface for improving the strength of the bonded connection of said sheet material thereto.

3. An edge attachment for a glass sheet member having marginal portions terminating in an edge surface, comprising a fabric loop extending along and bonded to both sides of said sheet at said marginal portion, and to the edge surface of said sheet; and a fabric strip projecting beyond said edge of said sheet on either side thereof, each fabric strip overlapping and bonded to the outer surface of said fabric loop along the portions of said loop extending along the side marginal portions of said sheet, said fabric strips including bearing means at the portion thereof beyond said edge of said sheet for attachment to adjacent structure.

4. A device as recited in claim 3 in which said loop is split so as to include overlapping bonded portions at said edge surface.

5. An attaching means for a glass sheet having side surfaces terminating with and interconnected by an end surface, comprising fabric loop means bonded to the side surfaces of said marginal portion of said sheet, and to the end surface thereof; a fabric strip bonded to the outer surface of each portion of said loop means which is bonded to the side surfaces of said sheet, said fabric strips projecting beyond said edge surface of said sheet; a rigid member secured to each of said fabric strips at a location remote from a said edge of said sheet; and fastener means extending through said rigid members for securing said fabric strips to adjacent structure.

6. A device as recited in claim 5 in which said bond between said fabric strips and said loop means includes a stitched connection therebetween substantially at the edge surface of said transparent sheet.

7. An edge attachment for a glass sheet member comprising a fabric loop complementarily bonded to the marginal edge portion of said sheet member so as to extend from one side of said sheet member to the marginal portion thereof to the other side of said sheet member at said marginal portion, a fabric strip means extending from either side of said sheet at said marginal portion so as to project beyond the outer edge thereof, said fabric strip means including means for attachment to adjacent structure, and means for mechanically interconnecting said fabric strip means and said loop means at substantially the edge of said sheet member.

8. An attaching arrangement for a glass panel having marginal side portions and an edge surface, comprising metallic means fused to said side portions and said edge surface; fabric means bonded to said metallic means, said fabric means including a loop complementarily engaging said metallic means, projecting strips extending beyond said edge surface, and a stitched connection between said loop and said projecting strips at substantially the location of said edge surface; structural means extending over said fabric means in a spaced relationship therewith; an injected sealing material interposed between said structural means and said fabric means; load carrying means bonded to said projecting strips at a location remote from said edge surface; and fastener means extending through said load carrying means and said structural means at said remote location for providing a connection therebetween.

9. An attaching device for adjoining glass panels, each of which is provided with marginal side surfaces and an edge surface, comprising a coating on said side and edge surfaces of said panels of a material capable of improving a cemented attachment thereto; a fabric loop complementarily cemented to each panel on the coated surfaces thereof, a duality of fabric strips for each panel, one being cemented to the portion of the fabric loop on one side marginal portion thereof and the other cemented to the portion of said loop on the other side marginal portion thereof, each strip having a stitched connection with said loop at substantially the location of said edge surface of said panel, said fabric strips of said panels extending beyond the edge surfaces thereof and overlapping at such location; load carrying means cemented to the projecting portion of each of said fabric strips; and at least one fastener means extending through the load carrying means of the projecting portions of the fabric strips of both of said panels for securing the same to adjacent structure.

10. The method of mounting a glass panel having marginal side and edge surfaces to adjacent structure comprising fusing a relatively thin metal coating on said marginal surfaces, cementing a complementary fabric loop to said metal coating, cementing a fabric strip to either side of said fabric loop so that said strips project beyond said end surface, providing a stitched connection between said fabric strips and said fabric loop at substantially the location of said end surface, cementing a bearing strip to the projecting portion of each of said strips, extending structural means over said bearing strips and over the portions of said fabric strips attached to said fabric loop in spaced relationship therewith, extending fasteners through said bearing strips and said structural means, and injecting a sealing material into the space between said portions of said fabric strip attached to said fabric loop and said structural means so as to substantially fill the space therebetween.

11. The method of attaching a glass panel having marginal side and edge surfaces to adjacent structure comprising the steps of heating said marginal portion of said glass to substantially 600° F., spraying on said surfaces of said glass a relatively thin coating of molten metal, cementing to said coating of metal a fabric loop substantially complementary thereto, cementing a fabric strip to either side of said fabric loop so as to provide projecting portions of said strip extending beyond said edge surface, cementing a bearing strip to the projecting portion of each of said fabric strips, and extending fasteners through said bearing strips and adjacent structure for attaching said panel thereto.

References Cited in the file of this patent

UNITED STATES PATENTS

| | | |
|---|---|---|
| 1,826,865 | Carr | Oct. 13, 1931 |
| 2,683,678 | Adams | July 13, 1954 |

U. S. DEPARTMENT OF COMMERCE
PATENT OFFICE
CERTIFICATE OF CORRECTION

Patent No. 2,808,355 October 1, 1957

Peter S. Christie et al.

It is hereby certified that error appears in the printed specification of the above numbered patent requiring correction and that the said Letters Patent should read as corrected below.

Column 6, line 25, for "member to" read --member at--.

Signed and sealed this 25th day of March 1958.

(SEAL)
Attest:
KARL H. AXLINE

Attesting Officer

ROBERT C. WATSON
Commissioner of Patents